US009121362B2

United States Patent
Betz et al.

(10) Patent No.: US 9,121,362 B2
(45) Date of Patent: *Sep. 1, 2015

(54) VALVETRAIN FAULT INDICATION SYSTEMS AND METHODS USING KNOCK SENSING

(76) Inventors: Brian E. Betz, Casco, MI (US); Hugh William Miller, Linden, MI (US)

(*) Notice: Subject to any disclaimer, the term of this patent is extended or adjusted under 35 U.S.C. 154(b) by 294 days.

This patent is subject to a terminal disclaimer.

(21) Appl. No.: 13/590,351

(22) Filed: Aug. 21, 2012

(65) Prior Publication Data

US 2014/0058650 A1    Feb. 27, 2014

(51) Int. Cl.
| | | |
|---|---|---|
| F02D 41/22 | (2006.01) | |
| F02D 35/02 | (2006.01) | |
| F01L 13/00 | (2006.01) | |
| F02P 5/152 | (2006.01) | |
| F02D 41/00 | (2006.01) | |

(52) U.S. Cl.
CPC ........... *F02D 41/221* (2013.01); *F01L 13/0031* (2013.01); *F01L 13/0036* (2013.01); *F02D 35/027* (2013.01); *F01L 2820/04* (2013.01); *F02D 2041/001* (2013.01); *F02P 5/1521* (2013.01); *Y02T 10/40* (2013.01)

(58) Field of Classification Search
CPC ............ F02D 2041/001; F02D 35/027; F02D 13/0207; F02D 13/0215; F02D 13/0261; F02D 41/221; F02D 13/0203; F02D 13/023; F02L 2001/0537; F02P 5/1526; G01L 23/221; G01M 15/042
USPC ............... 701/111, 102, 103, 105, 29.1, 29.7, 701/30.3, 30.5, 30.6, 31.7; 123/90.16
See application file for complete search history.

(56) References Cited

U.S. PATENT DOCUMENTS

| | | |
|---|---|---|
| 3,923,021 A | 12/1975 | Stark |
| 4,233,943 A | 11/1980 | Rogora et al. |
| 4,525,781 A | 6/1985 | Konomi et al. |
| 4,587,938 A | 5/1986 | Kobayashi et al. |

(Continued)

FOREIGN PATENT DOCUMENTS

| | | |
|---|---|---|
| CN | 1204003 A | 1/1999 |
| CN | 101074634 A | 11/2007 |

(Continued)

OTHER PUBLICATIONS

U.S. Appl. No. 13/024,726, filed Feb. 10, 2011, Julian R. Verdejo et al.

(Continued)

*Primary Examiner* — Stephen K Cronin
*Assistant Examiner* — Susan E Scharpf (57) ABSTRACT

A system for a vehicle includes a knock indication module, a valve control module, and a fault indication module. The knock indication module selectively indicates that knock occurred within a cylinder of an engine. The valve control module controls lifting of a valve of a cylinder of the engine and, in response to the knock indication module indicating that knock occurred within the cylinder, transitions lifting of the valve from one of a low lift state and a high lift state to the other one of the low lift state and the high lift state. The fault indication module selectively indicates that a fault is present in a variable valve lift (VVL) mechanism of the cylinder based on whether the knock indication module indicates that knock occurred within the cylinder after the transition to the other one of the low lift state and the high lift state.

19 Claims, 5 Drawing Sheets

(56) References Cited

U.S. PATENT DOCUMENTS

| | | | |
|---|---|---|---|
| 4,658,787 A | 4/1987 | Takizawa | |
| 4,691,677 A | 9/1987 | Hotate et al. | |
| 4,716,873 A | 1/1988 | Takaba et al. | |
| 4,730,587 A | 3/1988 | Norota et al. | |
| 4,760,825 A | 8/1988 | Morita | |
| 4,763,264 A | 8/1988 | Okuno et al. | |
| 4,788,942 A | 12/1988 | Pouring et al. | |
| 4,915,076 A | 4/1990 | Takizawa | |
| 4,919,096 A | 4/1990 | Manaka et al. | |
| 5,005,547 A | 4/1991 | Suga et al. | |
| 5,046,468 A | 9/1991 | Erhard | |
| 5,074,810 A | 12/1991 | Hobbs et al. | |
| 5,107,813 A | 4/1992 | Inoue et al. | |
| 5,110,310 A | 5/1992 | Hobbs | |
| 5,229,945 A | 7/1993 | Demizu et al. | |
| 5,408,863 A | 4/1995 | Sawyers et al. | |
| 5,477,826 A | 12/1995 | Hara et al. | |
| 5,632,247 A | 5/1997 | Hashizume et al. | |
| 5,699,253 A | 12/1997 | Puskorius et al. | |
| 5,700,171 A | 12/1997 | Horton | |
| 5,715,794 A | 2/1998 | Nakamura et al. | |
| 5,732,382 A | 3/1998 | Puskorius et al. | |
| 5,751,147 A | 5/1998 | Nakata et al. | |
| 5,765,528 A | 6/1998 | Kamimaru | |
| 5,771,482 A | 6/1998 | Rizzoni | |
| 5,905,193 A | 5/1999 | Hashizume et al. | |
| 6,023,651 A | 2/2000 | Nakayama et al. | |
| 6,085,143 A | 7/2000 | Przymusinski et al. | |
| 6,109,986 A | 8/2000 | Gaynor et al. | |
| 6,415,656 B1 | 7/2002 | Bidner et al. | |
| 6,485,341 B1 | 11/2002 | Lanyi et al. | |
| 6,668,812 B2 | 12/2003 | Javaherian | |
| 6,672,282 B2 | 1/2004 | Harrison et al. | |
| 6,691,653 B2 | 2/2004 | Denz | |
| 6,752,009 B2 | 6/2004 | Minich et al. | |
| 6,757,606 B1 | 6/2004 | Gonring | |
| 6,758,179 B1 | 7/2004 | McKay et al. | |
| 6,866,024 B2 | 3/2005 | Rizzoni et al. | |
| 6,999,868 B2 | 2/2006 | Funke et al. | |
| 7,024,304 B2 * | 4/2006 | Fukasawa et al. | 701/111 |
| 7,047,125 B1 | 5/2006 | He et al. | |
| 7,047,924 B1 * | 5/2006 | Waters et al. | 123/90.16 |
| 7,063,057 B1 * | 6/2006 | Waters et al. | 123/90.16 |
| 7,117,080 B2 | 10/2006 | Sobel | |
| 7,133,766 B2 | 11/2006 | Kokubo | |
| 7,146,851 B2 * | 12/2006 | Wakahara et al. | 73/114.72 |
| 7,167,789 B1 | 1/2007 | Froloff et al. | |
| 7,178,503 B1 | 2/2007 | Brehob | |
| 7,197,916 B2 | 4/2007 | Matsumoto et al. | |
| 7,214,110 B1 | 5/2007 | Ehlers et al. | |
| 7,243,532 B2 | 7/2007 | Tsujimura et al. | |
| 7,246,583 B2 | 7/2007 | Cinpinski et al. | |
| 7,251,557 B2 * | 7/2007 | Strom et al. | 701/114 |
| 7,325,446 B1 | 2/2008 | Assaf et al. | |
| 7,353,803 B2 | 4/2008 | Mathews et al. | |
| 7,361,067 B1 | 4/2008 | Smedema | |
| 7,437,233 B2 | 10/2008 | Yasui et al. | |
| 7,444,236 B2 * | 10/2008 | Wiles | 701/114 |
| 7,451,739 B2 * | 11/2008 | Yasui et al. | 123/406.23 |
| 7,469,678 B2 | 12/2008 | Ruiz | |
| 7,500,470 B2 | 3/2009 | Buslepp et al. | |
| 7,526,943 B2 | 5/2009 | Cubr et al. | |
| 7,530,261 B2 | 5/2009 | Walters | |
| 7,607,415 B2 | 10/2009 | Mathews et al. | |
| 7,623,955 B1 | 11/2009 | Rackmil et al. | |
| 7,654,248 B2 | 2/2010 | Buslepp et al. | |
| 7,665,558 B2 | 2/2010 | Akimoto et al. | |
| 7,685,996 B2 | 3/2010 | Brehob | |
| 7,698,935 B2 | 4/2010 | Dibble et al. | |
| 7,784,443 B2 | 8/2010 | Hitomi et al. | |
| 7,861,689 B2 | 1/2011 | Haug et al. | |
| 7,877,174 B2 | 1/2011 | Walser et al. | |
| 7,918,212 B2 | 4/2011 | Verdejo et al. | |
| 8,027,782 B2 | 9/2011 | Assaf et al. | |
| 8,176,896 B2 | 5/2012 | Verdejo et al. | |
| 8,245,692 B2 | 8/2012 | Glugla et al. | |
| 8,251,043 B2 | 8/2012 | Smith | |
| 8,261,603 B2 | 9/2012 | Kondo et al. | |
| 8,307,808 B2 | 11/2012 | Kaiser et al. | |
| 8,387,384 B2 | 3/2013 | Quigley et al. | |
| 8,392,096 B2 | 3/2013 | Mathews et al. | |
| 8,478,511 B2 | 7/2013 | Hamama et al. | |
| 8,532,908 B2 | 9/2013 | Morgan et al. | |
| 8,612,124 B2 | 12/2013 | Verdejo et al. | |
| 2002/0157639 A1 | 10/2002 | Kidokoro et al. | |
| 2004/0153286 A1 | 8/2004 | Yamada | |
| 2004/0236496 A1 | 11/2004 | Sobel | |
| 2005/0039721 A1 | 2/2005 | Truscott et al. | |
| 2005/0056240 A1 | 3/2005 | Sugiyama et al. | |
| 2005/0121005 A1 | 6/2005 | Edwards | |
| 2005/0204805 A1 | 9/2005 | Wakahara et al. | |
| 2006/0112933 A1 * | 6/2006 | Yasui et al. | 123/406.41 |
| 2006/0124107 A1 | 6/2006 | Sauler et al. | |
| 2006/0241848 A1 * | 10/2006 | Strom et al. | 701/105 |
| 2006/0254560 A1 | 11/2006 | Mann et al. | |
| 2006/0293827 A1 | 12/2006 | Frauenkron et al. | |
| 2007/0068474 A1 | 3/2007 | Cinpinski et al. | |
| 2007/0119391 A1 | 5/2007 | Fried et al. | |
| 2007/0233430 A1 | 10/2007 | Singh | |
| 2007/0239343 A1 | 10/2007 | Okubo et al. | |
| 2007/0295290 A1 | 12/2007 | Cao | |
| 2008/0006244 A1 | 1/2008 | Asano et al. | |
| 2008/0028387 A1 | 1/2008 | Nakagawa et al. | |
| 2008/0077307 A1 * | 3/2008 | Wiles | 701/111 |
| 2008/0178844 A1 | 7/2008 | Naegele et al. | |
| 2008/0183367 A1 | 7/2008 | Kapus et al. | |
| 2008/0283025 A1 | 11/2008 | Sato | |
| 2008/0312810 A1 | 12/2008 | Nonoyama | |
| 2009/0048729 A1 * | 2/2009 | Waters et al. | 701/29 |
| 2009/0090106 A1 | 4/2009 | Muller | |
| 2009/0192693 A1 | 7/2009 | Bottcher et al. | |
| 2009/0215331 A1 | 8/2009 | Suzuki et al. | |
| 2009/0223495 A1 | 9/2009 | Ohata et al. | |
| 2009/0229568 A1 | 9/2009 | Nakagawa | |
| 2009/0276142 A1 * | 11/2009 | Leone et al. | 701/103 |
| 2009/0276143 A1 | 11/2009 | Rackmil et al. | |
| 2009/0276147 A1 | 11/2009 | Hamama et al. | |
| 2010/0012079 A1 | 1/2010 | Nakazono et al. | |
| 2010/0037859 A1 | 2/2010 | Mashiki | |
| 2010/0063712 A1 | 3/2010 | Bromberg et al. | |
| 2010/0083936 A1 | 4/2010 | Verdejo et al. | |
| 2010/0088010 A1 * | 4/2010 | Verdejo et al. | 701/105 |
| 2010/0089361 A1 | 4/2010 | Inada et al. | |
| 2010/0094528 A1 | 4/2010 | Auclair et al. | |
| 2010/0152990 A1 | 6/2010 | Bjernetun et al. | |
| 2010/0152991 A1 | 6/2010 | Suzuki | |
| 2010/0192905 A1 | 8/2010 | Lewis et al. | |
| 2010/0294027 A1 | 11/2010 | Kondo et al. | |
| 2011/0067396 A1 | 3/2011 | Quigley et al. | |
| 2011/0139120 A1 | 6/2011 | Rollinger et al. | |
| 2011/0224882 A1 | 9/2011 | Makino et al. | |
| 2011/0246049 A1 | 10/2011 | Matsuo et al. | |
| 2011/0253100 A1 | 10/2011 | Kaiser et al. | |
| 2011/0265761 A1 | 11/2011 | Amann et al. | |
| 2011/0283972 A1 | 11/2011 | Wermuth et al. | |
| 2012/0048234 A1 | 3/2012 | Hamama et al. | |
| 2012/0078485 A1 | 3/2012 | Verdejo et al. | |
| 2012/0191275 A1 | 7/2012 | Clever et al. | |
| 2012/0191276 A1 | 7/2012 | Clever et al. | |
| 2012/0191277 A1 | 7/2012 | Clever et al. | |
| 2012/0209494 A1 | 8/2012 | Verdejo et al. | |
| 2013/0047956 A1 | 2/2013 | Davis | |
| 2013/0054109 A1 | 2/2013 | Buslepp et al. | |

FOREIGN PATENT DOCUMENTS

| | | |
|---|---|---|
| CN | 101331305 A | 12/2008 |
| DE | 102009008247 B3 | 8/2010 |
| JP | 2009174397 A | 8/2009 |
| JP | 2009275663 A | 11/2009 |

OTHER PUBLICATIONS

U.S. Appl. No. 13/590,369, filed Aug. 21, 2012, Brian E. Betz et al.
U.S. Appl. No. 13/775,628, Gwidt et al.

(56) References Cited

OTHER PUBLICATIONS

U.S. Appl. No. 12/357,776, Verdejo et al.
U.S. Appl. No. 12/478,159, Verdejo et al.
U.S. Appl. No. 12/762,516, Kaiser et al.
U.S. Appl. No. 12/762,523, Mathews et al.
U.S. Appl. No. 12/984,818, Verdejo et al.
U.S. Appl. No. 13/118,985, Morgan et al.
O'Reilly Auto Parts; Possible Cause of Engine Misfire: http://oreillyauto.com/site/app/newsfeed/detail?article=800649141; Nov. 23, 2011.
Tim Gilles; Automobile Service; Inspection, Maintenance, and Repair; Jun. 12, 2003; Delmar Learning; Second Edition; p. 560.

* cited by examiner

VALVETRAIN FAULT INDICATION SYSTEMS AND METHODS USING KNOCK SENSING

CROSS-REFERENCE TO RELATED APPLICATIONS

This application is related to U.S. patent application Ser. No. 13/590,369 filed on Aug. 21, 2012. The disclosure of the above related application is incorporated herein by reference in its entirety.

FIELD

The present disclosure relates to internal combustion engines and more particularly to systems and methods for identifying faults in a valvetrain.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include an internal combustion engine that generates drive torque. An intake valve is selectively opened to draw air into a cylinder of the engine. The air mixes with fuel to form an air/fuel mixture. The air/fuel mixture is combusted within the cylinder. An exhaust valve is selectively opened to allow the exhaust gas resulting from combustion to exit the cylinder.

One or more rotating camshafts regulate the opening and closing of the intake and/or exhaust valves. The camshafts include cam lobes that are fixed to and rotate with the camshafts. The geometric profile of a cam lobe determines a valve opening schedule. More specifically, the geometric profile of a cam lobe generally controls the period that the valve is open (duration) and the amount or distance (lift) that the valve opens.

Variable valve actuation (VVA) and variable valve lift (VVL) improve fuel economy, engine efficiency, and/or performance by modifying valve duration and lift, respectively, as a function of engine operating conditions. Two-step VVL systems include VVL mechanisms, such as hydraulically-controlled, switchable roller finger followers (SRFFs). A SRFF associated with a valve (e.g., the intake or exhaust valves) allows the valve to be lifted in two discrete states: a low lift state and a high lift state. The valve lift associated with the high lift state is greater than the valve lift associated with the low lift state.

SUMMARY

A system for a vehicle includes a knock indication module, a valve control module, and a fault indication module. The knock indication module selectively indicates that knock occurred within a cylinder of an engine. The valve control module controls lifting of a valve of a cylinder of the engine and, in response to the knock indication module indicating that knock occurred within the cylinder, transitions lifting of the valve from one of a low lift state and a high lift state to the other one of the low lift state and the high lift state. The fault indication module selectively indicates that a fault is present in a variable valve lift (VVL) mechanism of the cylinder based on whether the knock indication module indicates that knock occurred within the cylinder after the transition to the other one of the low lift state and the high lift state.

A method for a vehicle includes: selectively indicating that knock occurred within a cylinder of an engine; and controlling lifting of a valve of a cylinder of the engine. The method further includes: in response to an indication that knock occurred within the cylinder, transitioning lifting of the valve from one of a low lift state and a high lift state to the other one of the low lift state and the high lift state. The method further includes: selectively indicating that a fault is present in a variable valve lift (VVL) mechanism of the cylinder based on whether the occurrence of knock within the cylinder is indicated after the transition to the other one of the low lift state and the high lift state.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine combusts an air/fuel mixture within cylinders to generate drive torque. Air flows into a cylinder through an intake valve. Exhaust flows out of a cylinder through an exhaust valve. Each cylinder may include one or more intake valves and one or more exhaust valves.

A variable valve lift (VVL) mechanism enables operation of an associated valve (e.g., an intake valve or an exhaust valve) in two discrete lift states: a high lift state and a low lift state. During operation in the low lift state, the VVL mechanism opens the valve a first distance. The VVL mechanism opens the valve a second distance during operation in the high lift state, and the second distance is greater than the first distance.

A cylinder with a faulty VVL mechanism will have different combustion characteristics (e.g., burn rate) than other cylinders. For example, a cylinder with a faulty VVL mechanism may exhibit a greater level of knock than one or more other cylinders. The present disclosure describes systems and methods for detecting and indicating whether a fault is present in a VVL mechanism of a cylinder based on knock.

Figure 1A:
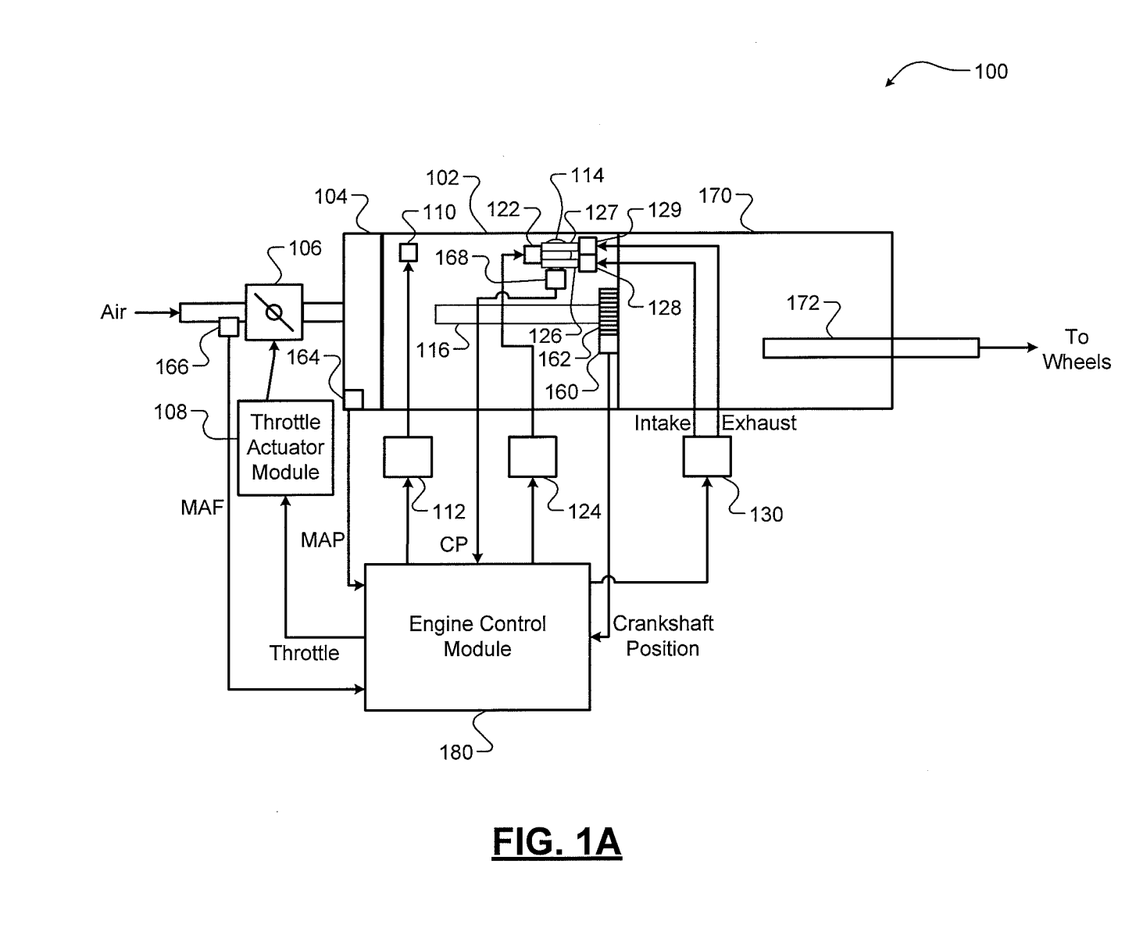
FIG. 1A is a functional block diagram of an example vehicle system according to the present disclosure.

Referring now to FIG. 1A, a functional block diagram of an example vehicle system 100 is presented. An engine 102 generates torque for a vehicle. Air is drawn into the engine 102 through an intake manifold 104. Airflow into the intake manifold 104 may be varied by a throttle valve 106. A throttle actuator module 108 (e.g., an electronic throttle controller) controls opening of the throttle valve 106. One or more fuel injectors, such as fuel injector 110, mix fuel with the air to form a combustible air/fuel mixture. A fuel actuator module 112 controls the fuel injectors.

A cylinder 114 includes a piston (not shown) that is coupled to a crankshaft 116. Although the engine 102 is depicted as including only the cylinder 114, the engine 102 may include more than one cylinder. The fuel injectors may inject fuel directly into the cylinders or at another suitable location. One combustion cycle of the cylinder 114 may include four strokes: an intake stroke, a compression stroke, an expansion stroke, and an exhaust stroke. During one revolution of the crankshaft 116 (i.e., 360 degrees of crankshaft rotation), two of the four strokes can occur. One engine cycle includes each of the cylinders undergoing one combustion cycle and occurs over two revolutions of the crankshaft 116 (i.e., 720 degrees of crankshaft rotation).

Figure 1B:
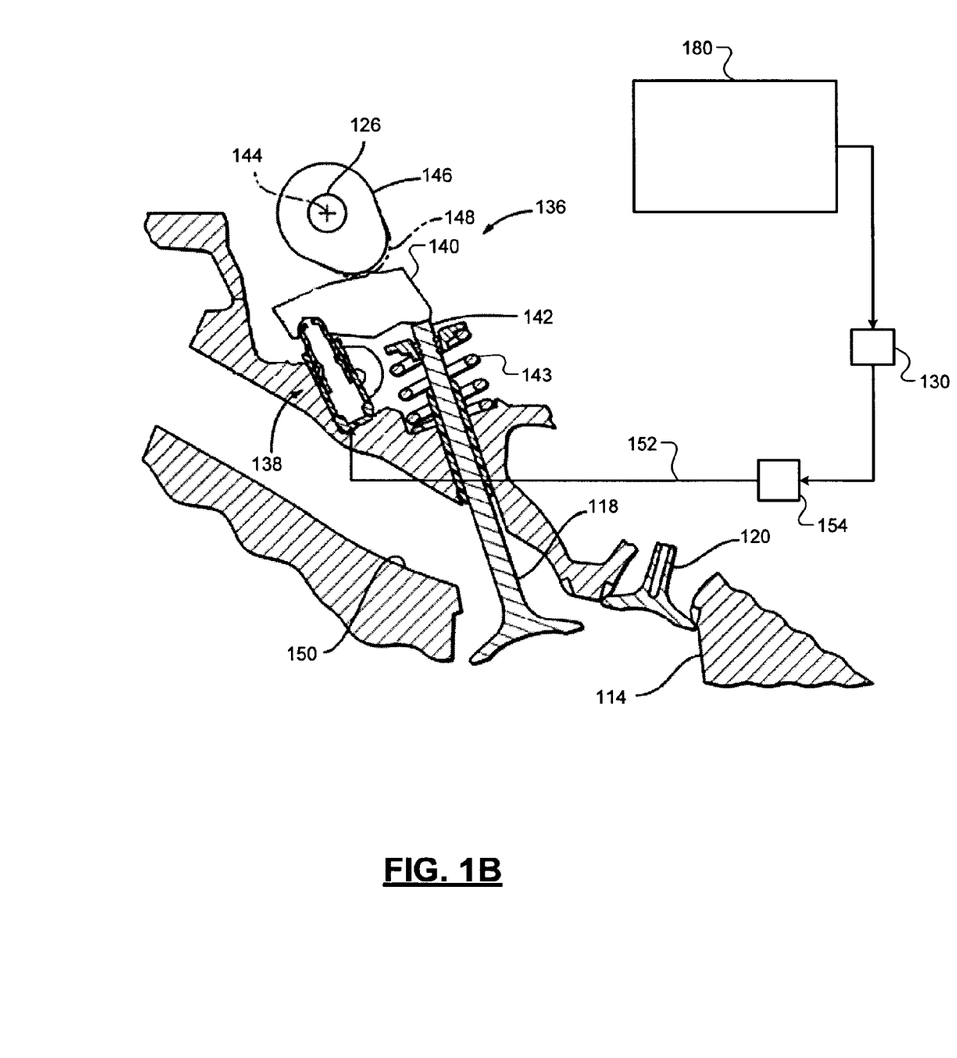
FIG. 1B is a diagram of an example variable valve lift (VVL) system according to the present disclosure.

Referring also to FIG. 1B, during the intake stroke, the piston is lowered to a bottom most position, and air and fuel may be provided to the cylinder 114. The bottom most position may be referred to as a bottom dead center (BDC) position. During the intake stroke, air enters the cylinder 114 through one or more intake valves associated with the cylinder 114, such as intake valve 118. One or more exhaust valves, such as exhaust valve 120, are also associated with the cylinder 114. While only the intake valve 118 and the exhaust valve 120 are shown and discussed, the cylinder 114 may include one or more additional intake valves and/or one or more additional exhaust valves.

During the compression stroke, the crankshaft 116 drives the piston toward a top most position. The top most position may be referred to as a top dead center (TDC) position. The intake valve 118 and the exhaust valve 120 are both closed during the compression stroke, and the piston compresses the contents of the cylinder 114. A spark plug 122 may ignite the air/fuel mixture. A spark actuator module 124 controls the spark plugs of the engine 102. The spark plugs may be omitted in various types of engines.

Combustion of the air/fuel mixture drives the piston back toward the BDC position during the expansion stroke. The piston drives the crankshaft 116. The rotational force (i.e., torque) on the crankshaft 116 from combustion of the air/fuel mixture may be a source of compressive force for a compression stroke of a combustion cycle of a next cylinder in a predetermined firing order of the cylinders.

Exhaust resulting from the combustion of the air/fuel mixture is expelled from the cylinder 114 during the exhaust stroke. The exhaust is expelled from the cylinder 114 via the exhaust valve 120. While the engine 102 is described as a four-stroke, spark ignition engine, the engine 102 may be another suitable type of engine. One or more electric motors may be provided with the engine 102.

The timing of opening and closing of the intake valve 118 is regulated by an intake camshaft 126. An intake camshaft, such as the intake camshaft 126, may be provided for each bank of cylinders of the engine 102. The timing of opening and closing of the exhaust valve 120 is regulated by an exhaust camshaft 127. An exhaust camshaft (not shown) may be provided for each bank of cylinders of the engine 102. Rotation of the intake camshaft(s) and the exhaust camshaft(s) is generally driven by rotation of the crankshaft 116, such as by a belt or a chain.

A cam phaser regulates rotation of an associated camshaft. For example only, intake cam phaser 128 regulates rotation of the intake camshaft 126. The intake cam phaser 128 may adjust the rotation of the intake camshaft 126, for example, with respect to rotation of the crankshaft 116, with respect to a position of the piston, with respect to another camshaft, etc. For example only, the intake cam phaser 128 may retard or advance rotation of the intake camshaft 126, thereby changing the opening and closing timing of the intake valve 118. An exhaust cam phaser 129 regulates rotation of the exhaust camshaft 127. Adjusting rotation of a camshaft with respect to rotation of the crankshaft 116 may be referred to as camshaft phasing.

A valve actuator module 130 controls the intake cam phaser 128. The valve actuator module 130 or another actuator module may control operation of the exhaust cam phaser 129. A cam phaser may be electrically or hydraulically actuated. Hydraulically actuated cam phasers operate based on pressure of a hydraulic fluid (e.g., oil) supplied to the cam phaser. Electrically actuated cam phasers operate using electrical power.

A variable valve lift (VVL) mechanism 136 (FIG. 1B) is associated with the intake valve 118. For example only, the VVL mechanism 136 may include a switchable roller finger follower (SRFF) mechanism. While the VVL mechanism 136 is shown and will be discussed as a SRFF, the VVL mechanism 136 may include other types of valve lift mechanisms that enable an associated valve to be lifted to two or more discrete lift positions. Further, while the VVL mechanism 136 is shown and discussed as being associated with the intake valve 118, another VVL mechanism may be implemented similarly for the exhaust valve 120. For example only, one VVL mechanism may be provided for each valve of each cylinder.

The VVL mechanism 136 includes a lift adjuster 138 and a cam follower 140. The cam follower 140 is in mechanical contact with a valve stem 142 of the intake valve 118. A biasing device 143 biases the valve stem 142 into contact with the cam follower 140. The cam follower 140 is also in mechanical contact with the intake camshaft 126 and the lift adjuster 138.

The intake camshaft 126 rotates about a camshaft axis 144. The intake camshaft 126 includes a plurality of cam lobes including low lift cam lobes and high lift cam lobes, such as low lift cam lobe 146 and high lift cam lobe 148. For example only, the intake camshaft 126 may include one low lift cam lobe and one high lift cam lobe for each intake valve of each cylinder. The exhaust camshaft 127 may include one low lift cam lobe and one high lift cam lobe for each exhaust valve of each cylinder. While only lifting of the intake valve 118 will be discussed, the present application is also applicable to exhaust valves and other intake valves.

The low and high lift cam lobes 146 and 148 rotate with the intake camshaft 126. Air may flow into the cylinder 114 through an inlet passage 150 when the intake valve 118 is open. Airflow into the cylinder 114 through the inlet passage 150 is blocked when the intake valve 118 is closed. The intake valve 118 is selectively opened and closed via the intake camshaft 126. More specifically, one of the low lift cam lobe 146 and the high lift cam lobe 148 opens and closes the intake valve 118 during a given combustion cycle.

A cam lobe contacting the cam follower 140 applies a force to the cam follower 140 in the direction of the valve stem 142 and the lift adjuster 138. The cam follower 140 may also be referred to as a rocker arm. The lift adjuster 138 is collapsible to allow the intake valve 118 to be opened to two discrete positions, a low lift position and high lift position. Pressure of a hydraulic fluid 152 may be controlled to control which one of the low lift cam lobe 146 and the high lift cam lobe 148 opens the intake valve 118 during a given combustion cycle.

During operation of the intake valve 118 in the low lift state, the low lift cam lobe 146 causes the VVL mechanism 136 to pivot in accordance with the geometry of the low lift cam lobe 146. The pivoting of the VVL mechanism 136 caused by the low lift cam lobe 146 opens the intake valve 118 a first predetermined amount or distance. During operation in the high lift state, the high lift cam lobe 148 causes the VVL mechanism 136 to pivot in accordance with the geometry of the high lift cam lobe 148. The pivoting of the VVL mechanism 136 caused by the high lift cam lobe 148 opens the intake valve 118 a second predetermined amount or distance. The second predetermined amount or distance is greater than the first predetermined amount or distance.

A fluid control valve 154 regulates the pressure of the hydraulic fluid 152. The valve actuator module 130 or another actuator module controls the fluid control valve 154 to control the pressure of the hydraulic fluid 152. The fluid control valve 154 may also be referred to as an oil control valve (OCV).

A crankshaft position sensor 160 (FIG. 1A) monitors an N-toothed wheel 162 and generates a crankshaft position signal based on rotation of the N-toothed wheel 162. For example only, the crankshaft position sensor 160 may include a variable reluctance (VR) sensor or another suitable type of crankshaft position sensor. The N-toothed wheel 162 rotates with the crankshaft 116.

A manifold absolute pressure (MAP) sensor 164 monitors pressure within the intake manifold 104 and generates a MAP signal based on the pressure. In various implementations, vacuum within the intake manifold 104 may be measured, where the vacuum is measured relative to ambient pressure. A mass air flowrate (MAF) sensor 166 monitors mass flowrate of air flowing through the throttle valve 106 and generates a MAF signal based on the mass flowrate.

A knock sensor 168 measures vibration of the engine 102 and generates a knock signal based on the vibration. For example only, the knock sensor 168 may include a piezoelectric knock sensor that is in contact with the engine 102 or another suitable type of knock sensor. While only the knock sensor 168 is shown and discussed, multiple knock sensors may be included. For example, one knock sensor may be provided for each cylinder of the engine 102, one knock sensor may be provided for each cylinder bank, etc. One or more other sensors may also be implemented.

The engine 102 transfers torque to a transmission 170. The transmission 170 may include a manual type transmission, an automatic type transmission, an auto-manual type transmission, or another suitable type of transmission. The transmission 170 may transfer torque to one or more wheels (not shown) via a transmission output shaft 172 and a driveline (not shown).

An engine control module (ECM) 180 controls operation of the engine 102. More specifically, the ECM 180 controls the throttle valve 106 via the throttle actuator module 108 and controls the fuel injectors via the fuel actuator module 112. The ECM 180 controls the spark plugs via the spark actuator module 124. The ECM 180 controls phasing of the intake and exhaust valves via the valve actuator module 130. The ECM 180 may also control lifting of the intake and exhaust valve via the valve actuator module 130.

Figure 2:
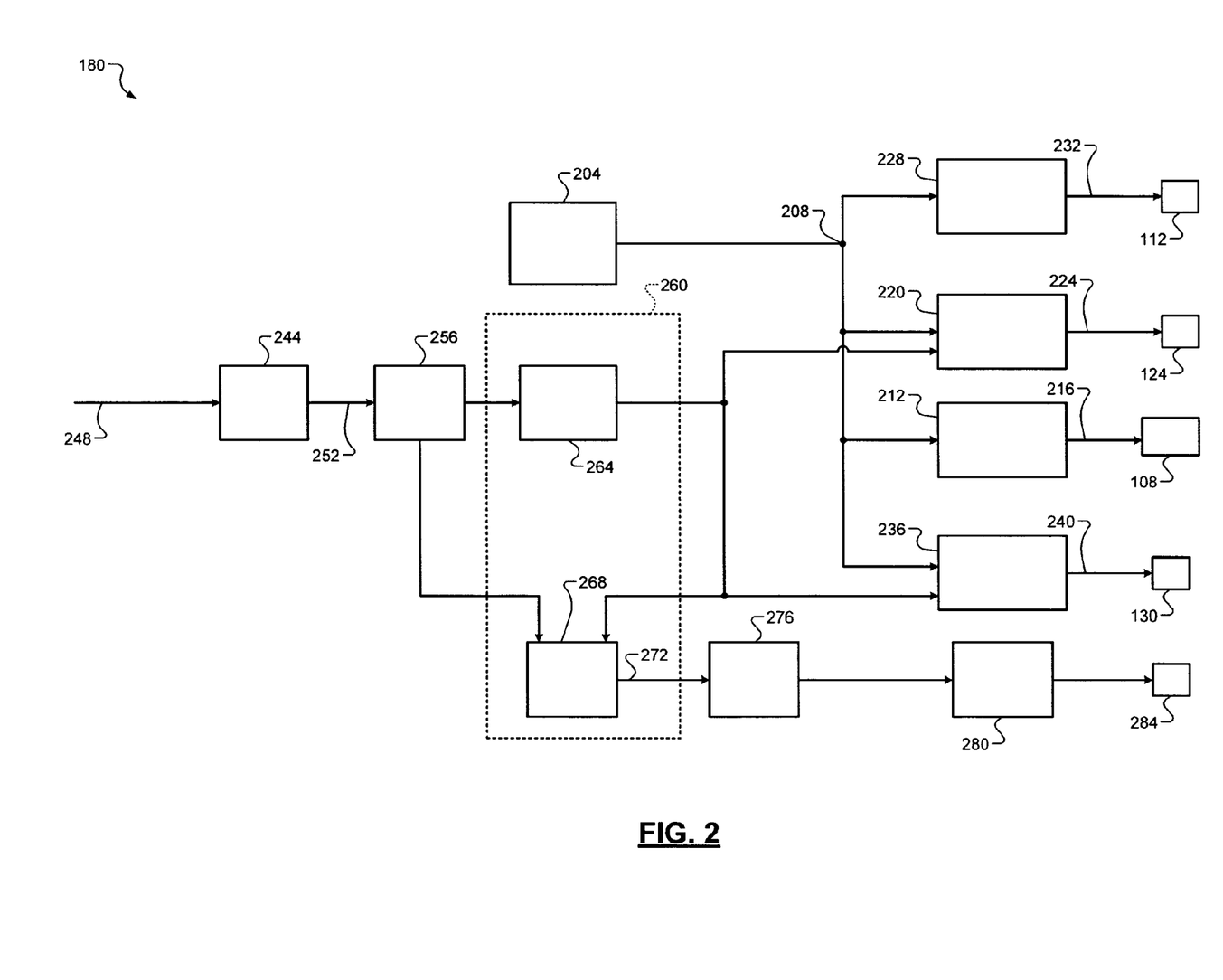
FIG. 2 is a functional block diagram of an example engine control system according to the present disclosure.

Referring now to FIG. 2, a functional block diagram of an example portion of the ECM 180 is presented. A driver torque module 204 may determine a driver torque request 208 based on one or more driver inputs, such as an accelerator pedal position, a brake pedal position, a cruise control input, and/or one or more other suitable driver inputs. One or more engine operating parameters may be controlled based on the driver torque request 208 and/or one or more other torque requests.

For example, a throttle control module 212 may determine a desired throttle opening 216 based on the driver torque request 208. The throttle actuator module 108 may adjust opening of the throttle valve 106 based on the desired throttle opening 216. A spark control module 220 may determine a desired spark timing 224 based on the driver torque request 208. The spark actuator module 124 may generate spark based on the desired spark timing 224.

A fuel control module 228 may determine one or more desired fueling parameters 232 based on the driver torque request 208. For example, the desired fueling parameters 232 may include fuel injection timing and amount. The fuel actuator module 112 may actuate the fuel injectors to inject fuel based on the desired fueling parameters 232.

A valve control module 236 may determine desired intake and exhaust phase angles (not shown in FIG. 2) and a desired lift state 240 based on the driver torque request 208. The desired lift state 240 may be one of the high lift state and the low lift state. The valve actuator module 130 controls operation of the valves in the high lift state or the low lift state at a given time based on the desired lift state 240. The valve actuator module 130 may control intake and exhaust camshaft phasing based on the desired intake and exhaust phase angles.

A knock indication module 244 indicates whether knock occurred within the cylinder 114 based on a knock signal 248 generated based on output from the knock sensor 168. The knock indication module 244 generates knock data 252 indicating whether knock occurred within the cylinder 114. The knock indication module 244 determines whether knock occurred in each other cylinder based on knock measured using a knock sensor and generates the knock data 252 accordingly. The knock indication module 244 performs the knock detection and indication for each combustion cycle of each cylinder of the engine 102.

A cylinder with a faulty VVL mechanism will have different combustion characteristics (e.g., burn rate) than other cylinders. For example, a cylinder with a faulty VVL mechanism may exhibit a greater level of knock than one or more other cylinders. A cylinder with a faulty VVL mechanism may, for example, exhibit knock more frequently (e.g., a greater number of combustion cycles) than cylinders with reliable VVL mechanisms and/or a cylinder with a faulty VVL mechanism may exhibit more observable knock (e.g., more vibration) than cylinders with reliable VVL mechanisms.

When a VVL mechanism is faulty, the associated valve will be stuck in operation in one of the high lift state and the low lift state, regardless of whether the desired lift state 240 is the high lift state or the low lift state. For example, when the VVL mechanism is faulty, the associated valve may be stuck operating in the high lift state both when the desired lift state 240 is the high lift state and when the desired lift state 240 is the low lift state.

A storage module 256 stores the knock data 252 for the cylinders and the combustion events. For example, the storage module 256 may track a number of times that the knock indication module 244 indicated that knock occurred for each cylinder over a predetermined period or a predetermined number of engine cycles.

A fault detection module 260 may include a transition command module 264 and a fault indication module 268. In response to occurrence of a greater level of knock in a cylinder relative to a level of knock in one or more other cylinders, the transition command module 264 commands the valve control module 236 to transition the desired lift state 240 to the other one of the lift states. The greater level of knock may include, for example, a greater number of occurrences of knock, more observable knock, or another suitable indicator of a greater level of knock.

When the desired lift state 240 is set to the high lift state, the valve control module 236 transitions the desired lift state 240 to the low lift state in response to the command. When the desired lift state 240 is set to the low lift state, the valve control module 236 transitions the desired lift state to the high lift state in response to the command.

The transition command module 264 may also command the spark control module 220 to selectively advance the spark timing in response to a greater level of knock in a cylinder relative to a level of knock in one or more other cylinders. The transition command module 264 may, for example, command the spark control module 220 to advance the spark timing by a predetermined amount each combustion cycle. Advancing the spark timing may make knock more observable. In advancing the spark timing, the spark control module 220 may advance the spark timing past a maximum best torque (MBT) spark timing for the operating conditions.

In response to the transition to the other one of the lift states, the fault indication module 268 monitors whether the cylinder continues to exhibit a greater level of knock than one or more other cylinders. The fault indication module 268 may wait a predetermined period or a predetermined number of engine cycles after the transition to the other one of the lift states before performing the monitoring.

The fault indication module 268 indicates whether a fault is present in a VVL mechanism of the cylinder based on whether the cylinder continues to exhibit a greater level of knock than one or more other cylinders after the transition to the other one of the lift states. For example, the fault indication module 268 may indicate that a fault is present in a VVL mechanism when the cylinder does not exhibit a greater level of knock than one or more other cylinders after the transition. When the cylinder continues to exhibit a greater level of knock than one or more other cylinders after the transition, the fault indication module 268 may indicate that no fault is present in a VVL mechanism.

In various implementations, a second transition in the desired lift state 240 may be performed when the cylinder does not exhibit a greater level of knock than one or more other cylinders after the transition to the other one of the lift states. In other words, the desired lift state 240 may be transitioned back to the original one of the lift states. The second transition may be performed, for example, to verify the presence of a fault in the VVL mechanism by verifying that the cylinder exhibits a greater level of knock during operation in the original one of the lift states and does not exhibit knock during operation in the other one of the lift states.

The fault indication module 268 may indicate whether a fault is present in a VVL mechanism of the cylinder based on knock of the cylinder after the second transition. For example, the fault indication module 268 may indicate that a fault is present in a VVL mechanism of the cylinder when the cylinder exhibits a greater level of knock than one or more other cylinders after the second transition. When the cylinder does not exhibit a greater level of knock than one or more other cylinders after the second transition, the fault indication module 268 may indicate that no fault is present in a VVL mechanism. The fault indication module 268 may again wait a predetermined period or a predetermined number of engine cycles after the second transition to the other one of the lift states before performing the monitoring.

The fault indication module 268 indicates whether a fault is present in a VVL mechanism of the cylinder via a VVL mechanism fault indicator 272. For example, the fault indication module 268 may set the VVL mechanism fault indicator 272 to an active state in memory 276 when a fault is present in a VVL mechanism of the cylinder. The fault indication module 268 may set the VVL mechanism fault indicator 272 to an inactive state when a fault is not present in a VVL mechanism. For example, the VVL mechanism fault indicator 272 may be a predetermined diagnostic trouble code (DTC) associated with a fault in a VVL mechanism of the cylinder. The fault in the VVL mechanism may be, for example, a broken rocker arm.

The fault indication module 268 may also generate the VVL mechanism fault indicator 272 to indicate whether the faulty VVL mechanism is stuck in operation in the high lift state or the low lift state. When the cylinder stops exhibiting knock after the transition and/or exhibits knock after the second transition, the fault indication module 268 may indicate that the VVL mechanism is stuck operating the associated valve in the original lift state. For example, when the desired lift state 240 was first transitioned from the low lift state to the high lift state and second transitioned from the high lift state to the low lift state, the fault indication module 268 may indicate that the VVL mechanism is stuck in the low lift state when the cylinder ceases exhibiting knock after the first transition to the high lift state and/or the cylinder exhibits knock after the second transition to the low lift state.

A monitoring module 280 may monitor generation of the VVL mechanism fault indicator 272 and/or one or more other fault indicators. In response to generation of the VVL mechanism fault indicator 272, the monitoring module 280 may, for example, illuminate a malfunction indicator lamp (MIL) 284. Based on the VVL mechanism fault indicator 272, a vehicle servicer can identify and replace the VVL mechanism that includes the fault and that caused the knock.

One or more other remedial actions may be taken in response to generation of the VVL mechanism fault indicator 272. For example only, the valve control module 236 may limit setting of the desired lift state 240 to the one of the lift states that the VVL mechanism is stuck. For example, when the fault indication module 268 indicates that the VVL mechanism is stuck in the low lift state, the valve control module 236 may set the desired lift state 240 only to the low lift state and refrain from setting the desired lift state 240 to the high lift state.

Figure 3:
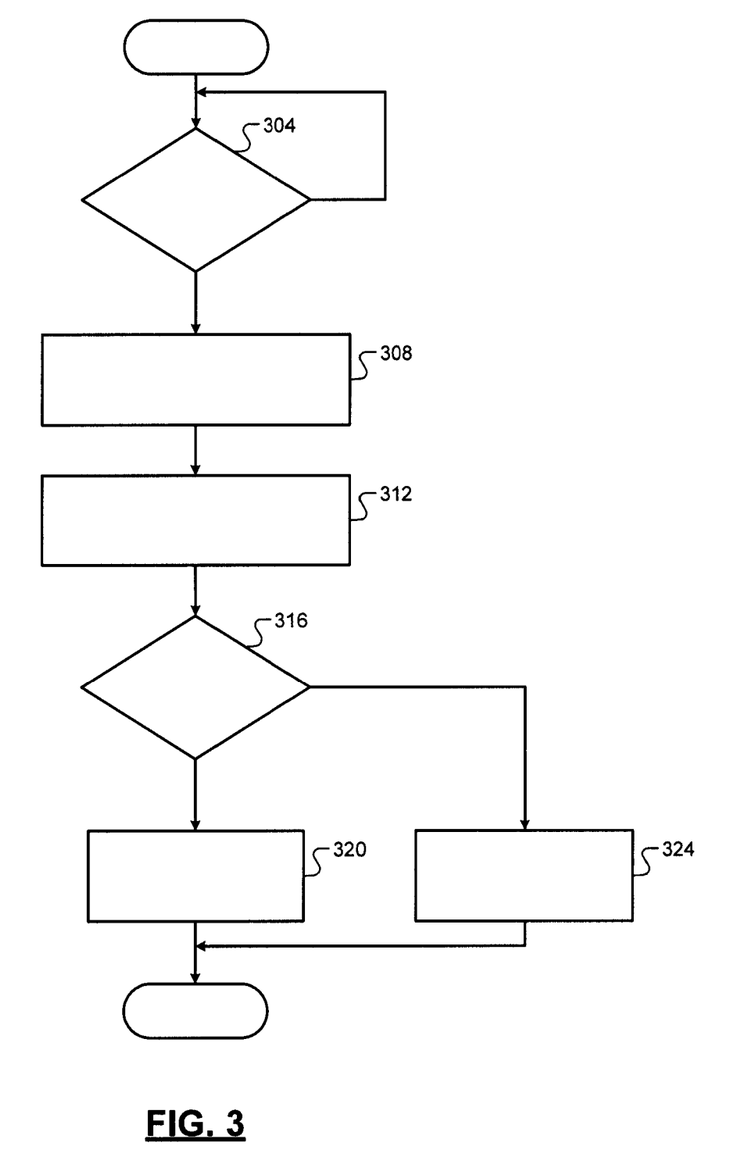
FIG. 3 is a flowchart depicting an example method of determining and indicating whether a fault is present in a VVL mechanism of a cylinder according to the present disclosure.

Referring now to FIG. 3, a flowchart depicting an example method of determining and indicating whether a fault is present in a VVL mechanism of a cylinder is presented. Control may begin with 304 where control determines whether one or more cylinder has a greater level of knock than one or more other cylinders. If true, control may selectively adjust (e.g., advance) the spark timing at 308 and continue with 312. If false, control may remain at 304.

At 312, control transitions the desired lift state 240 to the other one of the lift states. For example, if the desired lift state 240 is in the low lift state, control transitions the desired lift state 240 to the high lift state, and vice versa. At 316, control may determine whether the cylinder has a greater level of knock than one or more other cylinders. If false, control may indicate that a fault is present in a VVL mechanism of the cylinder at 320, and control may end. Control may also indicate that the VVL mechanism is stuck in operation in the one of lift states from before the transition at 320. For example, if the desired lift state 240 was in the low lift state before the transition, control may indicate that the VVL mechanism is stuck in operation in the low lift state at 320. If true at 316, control may indicate that no fault is present in the VVL mechanisms of the engine 102 at 324, and control may end.

One or more remedial actions may be taken when a fault is present in a VVL mechanism of the cylinder. For example, control may limit the desired lift state 240 to the one of the lift states in which the VVL mechanism is stuck and prevent the desired lift state 240 from being transitioned to the other one of the lift states. Additionally or alternatively, control may illuminate the MIL 284.

Figure 4:
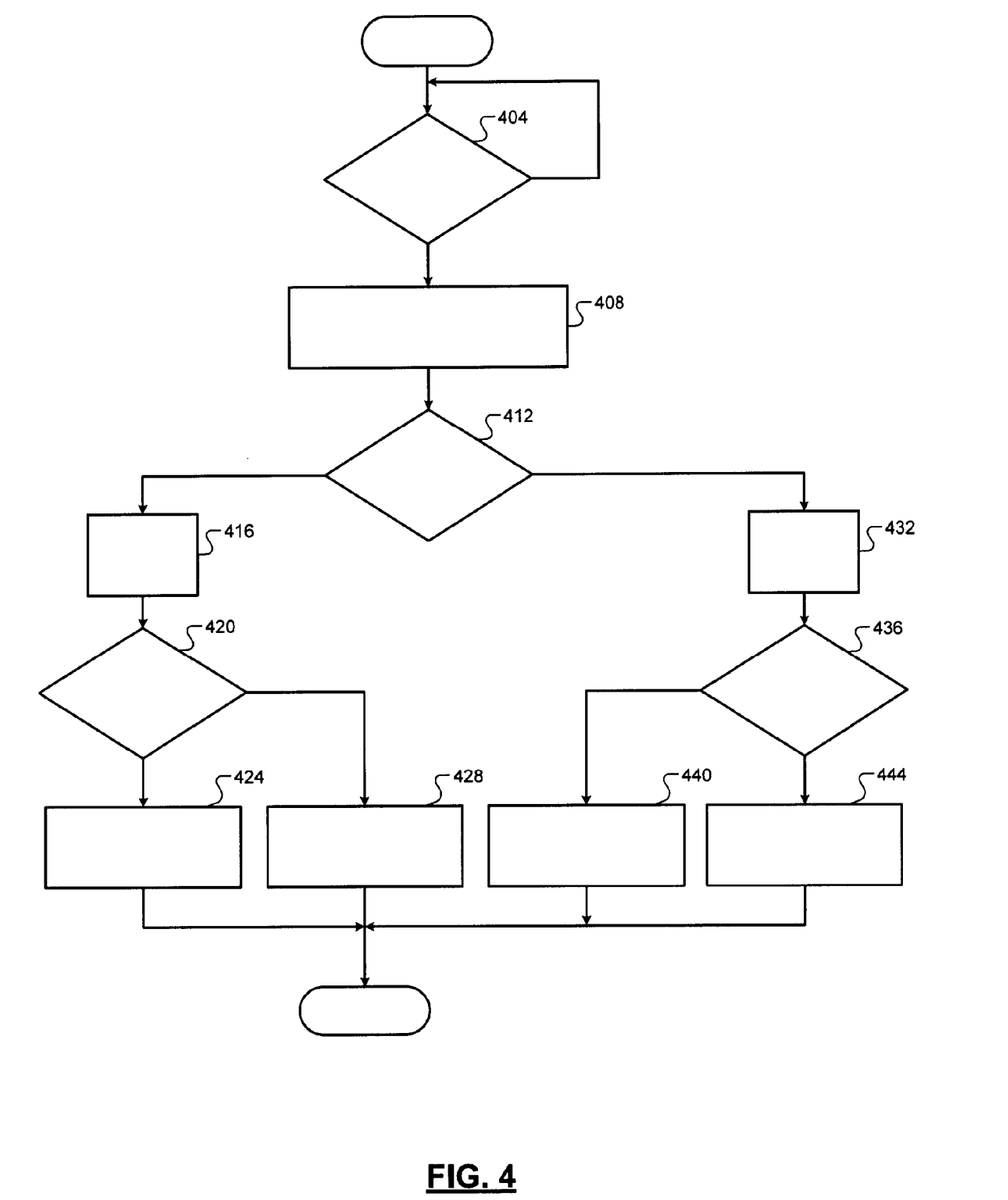
FIG. 4 is a flowchart depicting an example method of determining and indicating whether a fault is present in a VVL mechanism of a cylinder according to the present disclosure.

Referring now to FIG. 4, a flowchart depicting an example method of determining and indicating whether a fault is present in a VVL mechanism of a cylinder is presented. Control may begin with 404 where control may determine whether one or more enabling conditions for determining whether a fault is present in a VVL mechanism of a cylinder are satisfied. If true, control may continue with 408. If false, control may remain at 404.

At 408, control may selectively adjust (e.g., advance) the spark timing and continue with 412. Control may determine whether one or more cylinders have a greater level of knock than one or more other cylinders at 412. If true, control may continue with 416-428. If false, control may continue with 432-444 which are discussed further below.

Control transitions the desired lift state 240 to the other one of the lift states at 416. For example, if the desired lift state 240 is in the low lift state, control transitions the desired lift state 240 to the high lift state, and vice versa. At 420, control may determine whether the one or more cylinders have a greater level of knock than one or more other cylinders. If false, control may indicate that a fault is present in a VVL mechanism of the cylinder at 428, and control may end. Control may also indicate that the VVL mechanism is stuck in operation in the one of lift states from before the transition at 428. For example, if the desired lift state 240 was in the low lift state before the transition, control may indicate that the VVL mechanism is stuck in operation in the low lift state at 428. If true at 420, control may indicate that no fault is present in the VVL mechanisms of the cylinder at 424, and control may end.

As stated above, when 412 is false, control may continue with 432-444. At 432, control transitions the desired lift state 240 to the other one of the lift states. For example, if the desired lift state 240 is in the low lift state, control transitions the desired lift state 240 to the high lift state, and vice versa.

At 436, control may determine whether one or more cylinders have a greater level of knock than one or more other cylinders while not exhibiting knock before the transition. If true, control may indicate that a fault is present in a VVL mechanism of the cylinder at 440, and control may end. Control may also indicate that the VVL mechanism is stuck in operation in the one of lift states from before the transition at 440. For example, if the desired lift state 240 was in the low lift state before the transition, control may indicate that the VVL mechanism is stuck in operation in the low lift state at 440. If true at 436, control may indicate that no fault is present in the VVL mechanisms of the engine 102 at 444, and control may end.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system for a vehicle, comprising:
   a first electronic circuit that selectively indicates that knock occurred within a cylinder of an engine;
   a second electronic circuit that controls lifting of a valve of the cylinder of the engine and that, in response to the first electronic circuit indicating that knock occurred within the cylinder, transitions lifting of the valve from one of a low lift state and a high lift state to the other one of the low lift state and the high lift state; and
   a third electronic circuit that indicates that a fault is present in a variable valve lift (VVL) mechanism of the cylinder when the first electronic circuit does not indicate that knock occurred within the cylinder after the transition to the other one of the low lift state and the high lift state.

2. The system of claim 1 wherein the third electronic circuit further indicates that the valve is stuck operating in the one of the low lift state and the high lift state when the first electronic circuit does not indicate that knock occurred within the cylinder after the transition to the other one of the low lift state and the high lift state.

3. The system of claim 1 wherein the third electronic circuit further indicates that the fault is associated with the cylinder when the first electronic circuit does not indicate that knock occurred within the cylinder after the transition to the other one of the low lift state and the high lift state.

4. The system of claim 1 wherein the third electronic circuit indicates that the fault is not present in the VVL mechanism when the first electronic circuit indicates that knock occurred within the cylinder after the transition to the other one of the low lift state and the high lift state.

5. The system of claim 1 wherein the third electronic circuit indicates whether knock occurred within the cylinder based on a knock signal from a piezo-electric knock sensor.

6. The system of claim 1 wherein the third electronic circuit sets a predetermined diagnostic trouble code (DTC) in memory when a fault is present in the VVL mechanism.

7. The system of claim 6 further comprising a fourth electronic circuit that monitors the memory and that illuminates a malfunction indicator lamp in response to the setting of the predetermined DTC.

8. The system of claim 1 further comprising a fourth electronic circuit that selectively advances spark timing of the cylinder in response to the first electronic circuit indicating that knock occurred within the cylinder.

9. The system of claim 8 wherein the fourth electronic circuit advances the spark timing of the cylinder past a maximum best torque (MBT) spark timing in response to the knock indication module indicating that knock occurred within the cylinder.

10. The system of claim 1 wherein the first, second, and third electronic circuits include or are a part of at least one of: an Application Specific Integrated Circuit (ASIC); a combinational logic circuit; a field programmable gate array (FPGA); and a processor, memory, and code.

11. A method for a vehicle, comprising:
selectively indicating that knock occurred within a cylinder of an engine;
controlling lifting of a valve of a cylinder of the engine;
in response to an indication that knock occurred within the cylinder, transitioning lifting of the valve from one of a low lift state and a high lift state to the other one of the low lift state and the high lift state; and
indicating that a fault is present in a variable valve lift (VVL) mechanism of the cylinder in response to an indication that knock did not occur within the cylinder after the transition to the other one of the low lift state and the high lift state.

12. The method of claim 11 further comprising indicating that the valve is stuck operating in the one of the low lift state and the high lift state in response to the indication that knock did not occur within the cylinder after the transition to the other one of the low lift state and the high lift state.

13. The method of claim 11 further comprising indicating that a fault is associated with the cylinder in response to the indication that knock did not occur within the cylinder after the transition to the other one of the low lift state and the high lift state.

14. The method of claim 11 further comprising indicating that a fault is not present in the VVL mechanism in response to a second indication that knock occurred within the cylinder after the transition to the other one of the low lift state and the high lift state.

15. The method of claim 11 further comprising indicating whether knock occurred within the cylinder based on a knock signal from a piezo-electric knock sensor.

16. The method of claim 11 further comprising setting a predetermined diagnostic trouble code (DTC) in memory when a fault is present in the VVL mechanism.

17. The method of claim 16 further comprising:
monitoring the memory; and
illuminating a malfunction indicator lamp in response to the setting of the predetermined DTC.

18. The method of claim 11 further comprising selectively advancing spark timing of the cylinder in response to the indication that knock occurred within the cylinder.

19. The method of claim 18 further comprising advancing the spark timing of the cylinder past a maximum best torque (MBT) spark timing in response to the indication that knock occurred within the cylinder.

* * * * *

UNITED STATES PATENT AND TRADEMARK OFFICE
CERTIFICATE OF CORRECTION

PATENT NO.       : 9,121,362 B2
APPLICATION NO.  : 13/590351
DATED            : September 1, 2015
INVENTOR(S)      : Brian E. Betz It is certified that error appears in the above-identified patent and that said Letters Patent is hereby corrected as shown below:

<u>Title Page</u>, Item [73] Assignee, insert the following:

--GM Global Technology Operations LLC, Detroit, MI (US)--

Signed and Sealed this
Tenth Day of May, 2016

Michelle K. Lee
*Director of the United States Patent and Trademark Office*